(No Model.) 2 Sheets—Sheet 1.
A. SAUNDERS.
APPARATUS FOR THREADING PIPES AND BOLTS.
No. 317,022. Patented May 5, 1885.
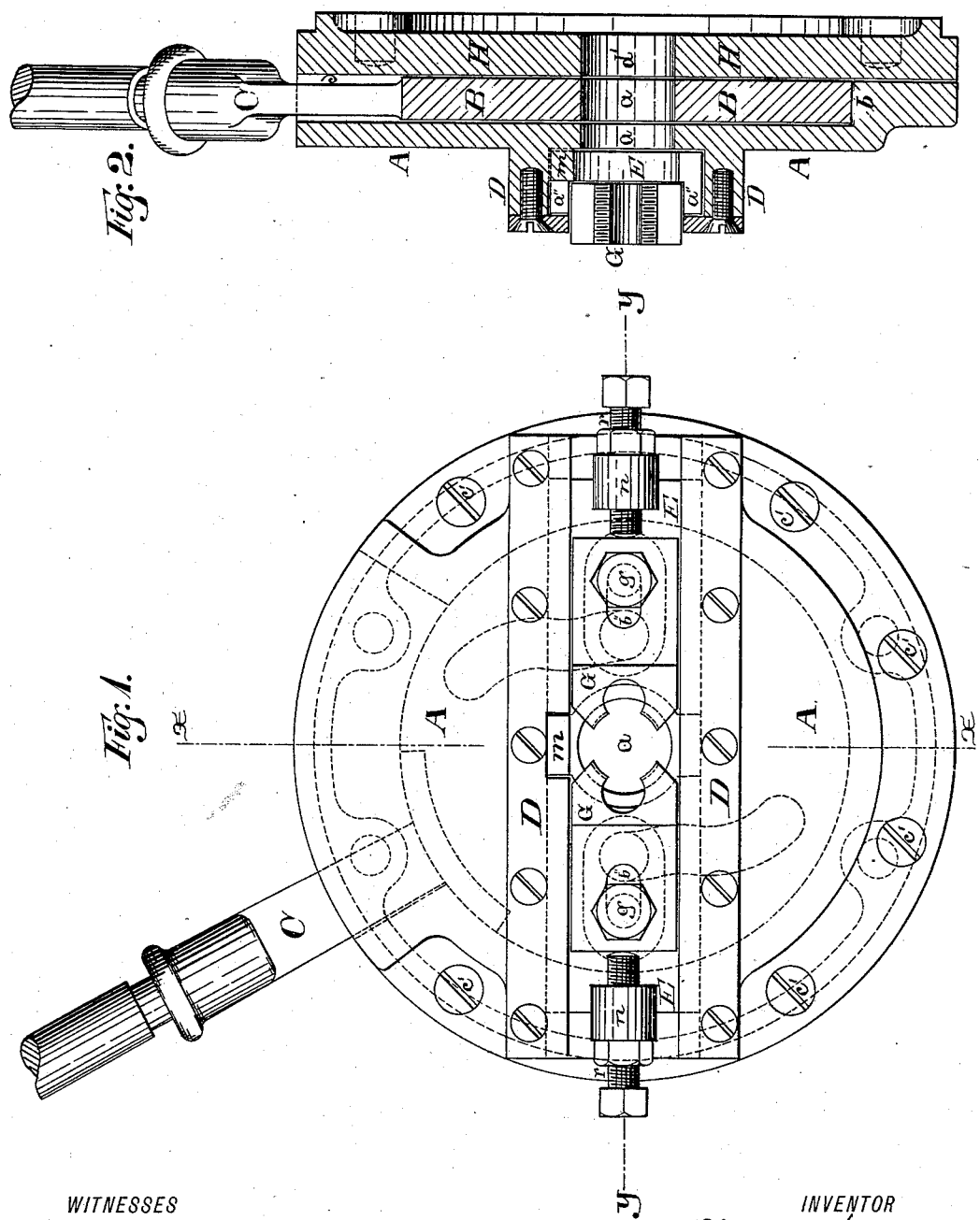
WITNESSES
Gunvald Aas.
Josiah T. Lovejoy
INVENTOR
Alexander Saunders
By James A. Whitney
Attorney.

(No Model.) 2 Sheets—Sheet 2.

A. SAUNDERS.
APPARATUS FOR THREADING PIPES AND BOLTS.

No. 317,022. Patented May 5, 1885.

WITNESSES
Gunvald Aas.
Josiah T. Lovejoy.

INVENTOR
Alexander Saunders.
By James A. Whitney
Attorney

United States Patent Office.

ALEXANDER SAUNDERS, OF YONKERS, NEW YORK.

APPARATUS FOR THREADING PIPES AND BOLTS.

SPECIFICATION forming part of Letters Patent No. 317,022, dated May 5, 1885.

Application filed February 6, 1885. (No model.)

*To all whom it may concern:*

Be it known that I, ALEXANDER SAUNDERS, of Yonkers, in the county of Westchester and State of New York, have invented certain Improvements in Apparatus for Threading Pipes and Bolts, of which the following is a specification.

This invention relates to that class of screw-thread-cutting machines commonly known as "adjustable expanding screw-cutting dies," in which the half-dies which form the thread upon the pipe or bolt, as the case may be, are expanded or spread apart to permit the speedy removal of the work after the operation is finished.

The object of this invention is to provide an apparatus of the class specified which may be more economically made than those commonly in use, in which the various parts subject to wear may be more readily replaced, which may be more conveniently adjusted to various sizes of work, and with which the half-dies may be more firmly and steadily held to their work. Said invention comprises certain novel combinations of parts by which said objects are effectually secured.

Figure 4:
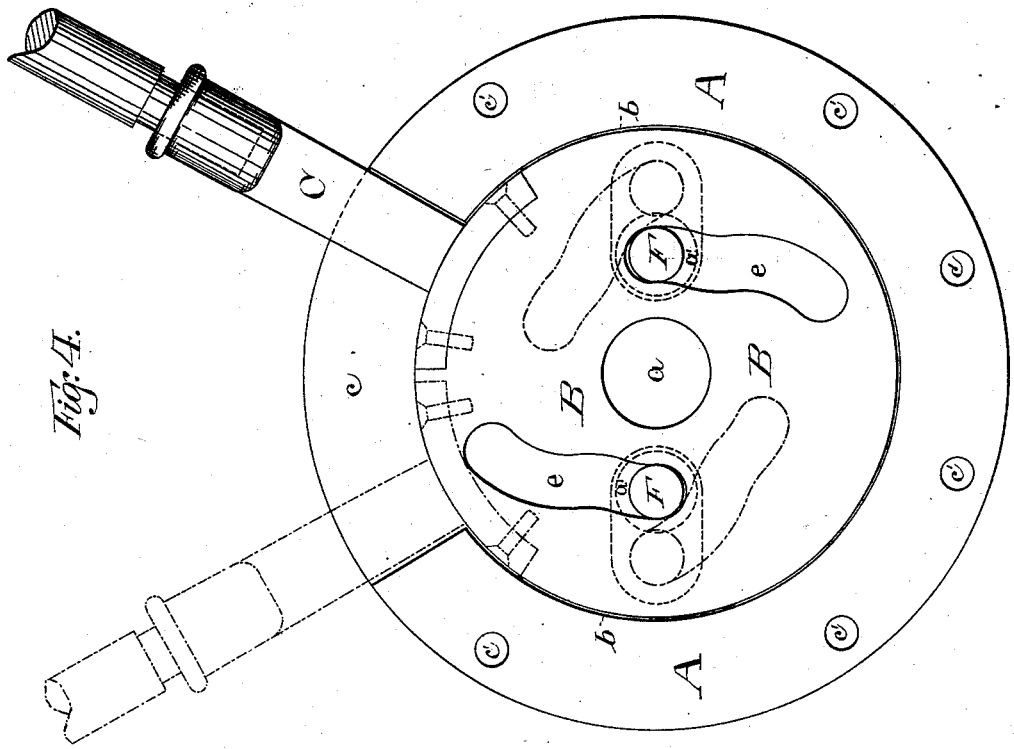
Figure 3:
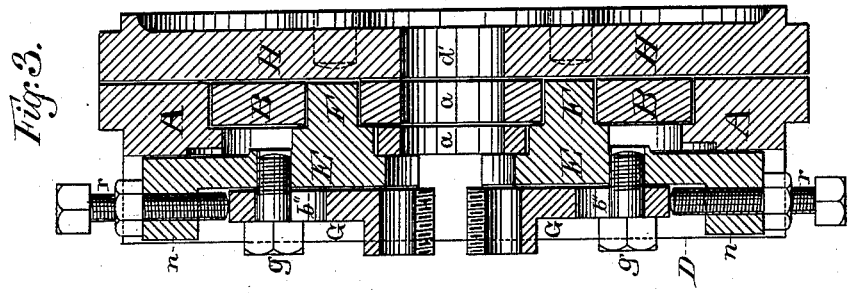

Figure 1 is a face or front view of an apparatus embracing my said invention. Fig. 2 is a sectional view in a plane transverse to that of Fig. 1, and taken in line *x x* of the latter. Fig. 3 is a transverse sectional view taken in line *y y* of Fig. 1. Fig. 4 is a rear view of certain parts of the apparatus.

A is a front plate, which at its back or inner side is circularly recessed, as shown at *b*, to receive a circular disk, B, which is provided with a radial lever-handle, C. The peripheral part of the front plate, A, is cut away to provide an opening, *c*, through which the lever-handle C projects, as shown in Fig. 4. By means of this handle a semi-rotatory movement may be given to the disk B in opposite directions. Both the front plate, A, and the disk B have an opening, *a*, at the center, in order that the pipe or bolt may move through the same in the operation of threading such pipe or bolt.

In the disk B, at opposite parts thereof, are two slots, *e*. At their inner ends, *a'*, these slots are concentric with the axis. The remaining portion and main length of each of said slots is eccentric to such axis, as illustrated in Fig. 4.

Formed in the front plate, A, opposite or coincident with the slots *e* of the disk B, are openings.

Upon the front or outer surface of the front plate, A, and extending centrally across the same, are guides D, in which are placed carrier-blocks E, one at each side of the central opening, *a*, of said front plate. A stop, *m*, formed on the front plate, limits the inward movement of these carrier-blocks. Inward or backward from each carrier-block, through the adjacent opening, extend pins or studs F. When the disk B is turned in one direction, the eccentric or cam-like action of the slots *e* moves the carrier-blocks simultaneously outward. When said disk is turned in the opposite direction, the carrier-blocks are moved simultaneously inward. The carrier-blocks are longitudinally recessed, to receive the "half-dies" G G, so termed, by which the screw-thread is formed, the inner ends of the two half-dies carried by the two carrier-blocks being constructed in the usual or in any suitable manner to co-operate in forming the thread. Each half-die G is kept from lateral displacement by the flanges *a''* of the carrier-block in which it is placed, and from displacement in a forward direction by means of a broad-headed set-screw, *g*, which passes through a long slot, *b''*, in the half-die, and is screwed into the carrier-block.

At the outer end of each carrier-block is an upwardly-projecting nut, *n*, through which extends a screw, *r*, which bears against the rear end of the half-die. By means of these screws *r* the half-dies may be readily adjusted to any desired distance apart to suit the diameter of the pipe or bolt upon which the thread is to be formed. The disk B is retained in the circular recess *b* of the front plate, A, by a back plate, H, attached thereto by screws or bolts at *c'*, or other suitable means.

The apparatus is affixed, in the manner usual with this class of machinery, to the face-plate of the ordinary sliding head of a screw-threading machine. In this back plate, H, is a central opening, $a$, coincident with the opening of the front plate, A, and disk B.

In the use and operation of the apparatus the bolt or pipe, as the case may be, is fed thereto by any usual means and in any usual manner. The pipe or bolt, as the case may be, being fed into the front of the apparatus between the half-dies G, the latter being first adjusted so that when the carrier-blocks strike the stop $m$ the cutting end of the half-dies will be at the distance apart proper for the size of pipe or bolt to be cut, the lever-handle is operated to turn the disk to actuate the carrier-blocks toward each other, and thus bring the cutting ends of the half-dies against the pipe or bolt to be threaded, this movement of the lever being continued until the concentric parts $a'$ of the slots receive the pins or studs, which done, the outer sides of the slots resist the radial tendency of the pins or studs, and consequently hold the carrier-blocks, and of course the half-dies, to their work, by a fixed and positive resistance, which insures their most effective action in completing the cutting or formation of the screw-thread. When this is completed, the lever-handle is moved in an opposite direction, and the disk, by actuating the carrier-blocks in an outward direction, opens the apparatus, so that the threaded pipe or bolt may be readily withdrawn.

It is to be remarked that the stop $m$, by limiting the inward movement of the carrier-blocks, gages the depth to which the screw-thread is cut on the bolt or pipe, the half-dies being suitably adjusted to suit the diameter of the pipe or bolt and the depth of thread required.

What I claim as my invention is—

1. The combination of the front plate, A, constructed with guides D and circular recess $b$, the disk B, constructed for use with a lever-handle, C, and eccentric slots $e$, the back plate, H, and carrier-blocks E, constructed with the pins or studs F, and provided with suitable half-dies, all substantially as and for the purpose herein set forth.

2. The combination of the front plate, A, constructed with guides D and circular recess $b$, the disk B, constructed for use with lever-handle C, and with slots $e$, eccentric as to their main length and concentric at their inner ends with the axis of motion of the disk, the back plate, H, and carrier-blocks E, constructed with the pins or studs F and provided with suitable half-dies, all substantially as and for the purpose herein set forth.

3. The combination of the front plate, A, constructed with guides D and circular recess $b$, the stop $m$, the disk B, constructed for use with a lever-handle, C, and having eccentric slots $e$, and the carrier-blocks E, constructed with the pins or studs F, and provided with suitable half-dies, all substantially as and for the purpose herein set forth.

4. The combination of the front plate, A, constructed with guides D and circular recess $b$, the carrier-blocks E, having slots $b''$, flanges $a''$, and pins or studs F, the bolts or set-screws $g$, the disk B, constructed for use with a lever-handle and having eccentric slots $e$, and the back plate, H, all substantially as and for the purpose herein set forth.

5. The combination of the front plate constructed with the guides D and circular recess $b$, the stop $m$, the carrier-blocks E, having slots $b''$, flanges $a''$, and pins or studs F, the bolts or set-screws $g$, the half-dies G, the disk B, constructed for use with a lever-handle and having eccentric slots $e$, and the back plate, H, all substantially as and for the purpose herein set forth.

6. The combination of the front plate, A, constructed with the guides D and circular recess $b$, the stop $m$, the carrier-blocks E, having slots $b''$, flanges $a''$, and pins or studs F, the bolts or set-screws $g$, the half-dies G, the disk B, constructed for use with a lever-handle, and having slots $e$, eccentric as to their main length and concentric at their inner ends with the axis of movement of the disk, and the back plate, H, all substantially as and for the purpose herein set forth.

ALEXANDER SAUNDERS.

Witnesses:
GUNVALD AAT,
JAMES A. WHITNEY.